US007058480B1

(12) United States Patent
Kawanishi et al.

(10) Patent No.: US 7,058,480 B1
(45) Date of Patent: Jun. 6, 2006

(54) POWER SUPPLY CONTROL DEVICE, APPARATUS EQUIPPED THEREWITH AND RECORDING MEDIUM

(75) Inventors: Toshiharu Kawanishi, Kawasaki (JP); Naoki Izuta, Mitaka (JP); Satoshi Kajiyashiki, Kawasaki (JP); Hitoshi Matsumori, Kawasaki (JP); Masato Semii, Yokohama (JP); Minoru Harada, Hirata (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 09/706,859

(22) Filed: Nov. 7, 2000

(30) Foreign Application Priority Data

Nov. 16, 1999 (JP) ................................. 11-325619

(51) Int. Cl.
*G06F 19/00* (2006.01)
(52) U.S. Cl. ..................... 700/286; 700/79; 713/320
(58) Field of Classification Search ................ 700/286, 700/22, 291, 293, 295, 296, 297, 79, 298; 713/320, 321, 340; 323/274, 276; 340/370.02
See application file for complete search history.

(56) References Cited

U.S. PATENT DOCUMENTS

| 5,828,568 A | * | 10/1998 | Sunakawa et al. ............ 700/79 |
| 6,018,690 A | * | 1/2000 | Saito et al. ................. 700/295 |
| 6,564,332 B1 | * | 5/2003 | Nguyen et al. ............. 713/340 |

* cited by examiner

*Primary Examiner*—Kidest Bahta
(74) *Attorney, Agent, or Firm*—Staas & Halsey LLP

(57) ABSTRACT

A power supply control apparatus is provided in which it is possible to easily calculate and predict a necessary and sufficient power consumption value in a device which consumes electric power. As a result, it can positively prevent a shortage or surplus of the power supply capacity, thus saving unnecessary costs for power supply equipment. Still further, it is also prevent the occurrence of critical situations such as missing or loss of stored information due to a shortage of the power supply capacity. To this end, in a device which is supplied with electric power from a power supply unit, configuration units constituting the device are stored as configuration information, and an amount of power consumed by each configuration unit is also stored as power consumption information. Based on the configuration information and the power consumption information thus stored, there is obtained a power consumption value of the device, on the basis of which a prescribed processing is carried out.

14 Claims, 16 Drawing Sheets

CONFIGURATION INFORMATION TABLE

| NO. | LOAD | CURRENT NUMBER |
|---|---|---|
| 1 | PROCESSING BASIC MODULE | a1 |
| 2 | CPU-A | a2 |
| 3 | CPU-B | a3 |
| 4 | MEM-A | a4 |
| 5 | MEM-B | a5 |
| 6 | CONTROLLER | a6 |
| 7 | PANEL SENSOR | a7 |
| 8 | FAN-A | a8 |
| 9 | FAN-B | a9 |
| 10 | POWER SUPPLY CONTROL APPARATUS A | a10 |
| 11 | POWER SUPPLY CONTROL APPARATUS B | a11 |
| : | : | : |

FIG. 6

POWER CONSUMPTION INFORMATION TABLE

| NO. | LOAD | +2.5V(W) | +48V(W) | +8V(W) |
|---|---|---|---|---|
| 1 | PROCESSING BASIC MODULE | d1 | e1 | f1 |
| 2 | CPU-A | d2 | e2 | f2 |
| 3 | CPU-B | d3 | e3 | f3 |
| 4 | MEM-A | d4 | e4 | f4 |
| 5 | MEM-B | d5 | e5 | f5 |
| 6 | CONTROLLER | d6 | e6 | f6 |
| 7 | PANEL SENSOR | d7 | e7 | f7 |
| 8 | FAN-A | d8 | e8 | f8 |
| 9 | FAN-B | d9 | e9 | f9 |
| 10 | POWER SUPPLY CONTROL APPARATUS A | d10 | e10 | f10 |
| 11 | POWER SUPPLY CONTROL APPARATUS B | d11 | e11 | f11 |
| : | : | : | : | : |

FIG. 7

POWER SUPPLY CONFIGURATION INFORMATION TABLE

| NO. | POWER SUPPLY MODULE | CURRENT NUMBER |
|---|---|---|
| 1 | POWER SUPPLY A | b1 |
| 2 | POWER SUPPLY B | b2 |
| ⋮ | ⋮ | ⋮ |

FIG. 8

POWER SUPPLY CAPACITY INFORMATION TABLE

| NO. | POWER SUPPLY MODULE | +2.5V(W) | +4.8V(W) | +8V(W) |
|---|---|---|---|---|
| 1 | POWER SUPPLY A | g1 | h1 | i1 |
| 2 | POWER SUPPLY B | g2 | h2 | i2 |
| ⋮ | ⋮ | ⋮ | ⋮ | ⋮ |

FIG. 9

POWER SUPPLY CONTROL DEVICE, APPARATUS EQUIPPED THEREWITH AND RECORDING MEDIUM

BACKGROUND OF THE INVENTION

1. Field of the Invention

The present invention relates to a power supply control device for predicting or estimating an amount of power consumption in an apparatus such as, for example, a server apparatus, an information processing apparatus, or computer and performing power supply control on a power supply unit.

2. Description of the Related Art

In recent apparatuses, scalability for processing ability and field upgrading at customers' locations are required. Upon such upgrading, the configuration of an apparatus is divided into a plurality of blocks for respective functions, and new blocks are added in compliance with the processing ability as required. In this case, it is necessary to grasp a power consumption as to whether the power supply provided on the apparatus can sufficiently supply the amount of power to be consumed by the respective blocks, and if the amount of power consumption exceeds the capacity of the power supply, it will be needed to provide an additional power supply or replace the existing power supply with a new one having an increased power supply capacity.

In the grasping of the power consumption, for example, the amount of power consumption of the apparatus before upgrading thereof is first grasped, and an amount of power consumption increased as a result of upgrading is then estimated so as to determine whether the increased power consumption can be accommodated by the capacity of the existing power supply provided on the apparatus. If it is determined that the capacity of the existing power supply is insufficient, the power supply capacity is then increased.

In the past, however, the grasping of the power consumption in such an apparatus is carried out, for example, based on the number of components constituting each function, or the number of blocks divided for each component.

In the grasping of the power consumption as described above, however, in order to serve for simplification thereof and to grasp the power consumption on the safe side so as to avoid a shortage of the capacity of the power supply, the amount of power consumption in each block is often set to be equal to that of a block having a largest configuration which consumes the greatest power among the plural blocks, or the amount of power consumption for each block is set to the greatest possible power consumption which can be taken for the greatest possible configuration of each component. As a result, there are many cases in which the overall power consumption of the apparatus is overestimated.

Accordingly, in the case of field upgrading for example, as a result of the overestimation of the power consumption amount in spite of the fact that the existing power supply is in actuality sufficient for the power consumption, the capacity of the existing power supply can often be determined to be short and hence a new power supply is added or the existing power supply is replaced by a new larger one. Such a replacement of the power supply or addition of the new power supply often gives rise to problems such as useless and wasteful consumption of resources and unnecessary high costs.

On the other hand, in the case where the amount of power consumption is underestimated, if the estimation of the power consumption is less than the actual power consumption, there will be serious situations. That is, a shortage of the power supply capacity results, causing the function of the apparatus to halt, or important information stored might be lost.

Moreover, in the past, there is another problem in that when a power supply having a capacity insufficient for the power consumption of a device is connected to the device, there is no appropriate measure to cope with such a situation, thus giving rise to a critical accident as described above.

SUMMARY OF THE INVENTION

In view of the above, the present invention is intended to obviate the above-mentioned problems encountered with the prior art, and has for its object to provide a novel and improved power supply control device and an apparatus equipped therewith in which a necessary and sufficient amount of power consumption or power supply capacity can be calculated or estimated with ease to thereby prevent a shortage or surplus of the power supply capacity, thus saving unnecessary costs for power supply equipment while preventing serious situations such as loss or missing of stored information due to a shortage of the power supply capacity.

According to one aspect of the present invention, there is provided a power supply control device for an apparatus which is supplied with electric power from a power supply, the device comprising: a calculator for calculating a power consumption value of the device based on configuration information on each configuration unit constituting the apparatus and an amount of power consumed by each configuration unit; and a controller for performing a predetermined procedure based on the power consumption value calculated by the calculator.

With the above arrangement, each configuration unit can be correlated to a corresponding amount of power consumption, and hence, for example, by adding up the respective power consumption amounts over the entire apparatus, the amount of power consumption of the entire apparatus can be calculated. Thus, the amount of power consumption can be calculated more easily and accurately by the inventive device than by any conventional one. In addition, in the case where only the power consumption of part of components of the apparatus is required for calculation of the power consumption of the entire apparatus, it is possible to use the configuration information and power consumption for the part of components alone.

Upon changing the configuration of the apparatus, it is possible to easily calculate or estimate the amount of power consumption after the configuration change based on the configuration information related to the configuration to be changed and the corresponding power consumption value. Accordingly, if the controller is operated to display the power consumption value for example, the user can readily see the amount of power consumption being currently consumed or to be consumed after the configuration change.

Moreover, if the controller is operated to make a comparison between the calculated power consumption value and power supply capacity of the apparatus and display a difference therebetween, the user can know a shortage or surplus of the power supply capacity with ease and at once, whereby it is possible to avoid providing a power supply unit (power supply) having an unnecessarily large or insufficient power supply capacity.

Here, it is to be noted that the configuration unit constituting the configuration information means, for example, each unit component obtained when the configuration of the apparatus is divided by predetermined units. The unit component includes a module unit constituting the device, a functional block unit which performs a predetermined processing, etc. The configuration information further includes the number of the respective configuration units.

Preferably, the power supply control device according to the present invention further comprises a detector for detecting an amount of power supplied from the power supply to the apparatus during operation of the apparatus. The controller performs the predetermined processing in accordance with the detection result of the detector.

Thus, with the provision of the detector for detecting power, an amount of change in the power consumption caused by the configuration change of the apparatus is added to or subtracted from the measured value of power actually consumed by the apparatus to calculate the amount of power to be consumed by the apparatus after the configuration change, thereby making it possible to predict or estimate the power consumption in a reliable manner. Specifically, even if the power consumption corresponding to the configuration information used by the calculator differs from the actual power consumption, or even if part of the power consumption information is missing or incorrect, the power consumption can be predicted or estimated with increased accuracy. This is because using the power consumption value actually measured in above manner, it is possible to calculate the power consumption of the apparatus after the configuration change based on the amount of power detected by the detector and the change-related configuration information, i.e., a difference between the before-change configuration information and the after-change configuration information.

Preferably, the power supply control device according to the invention further comprises a storage element for storing the configuration information, and an input device for inputting the configuration information to the storage element so as to be stored therein.

According to this arrangement, a means for automatically recognizing the connection of the configuration units is used as the input device, thus omitting the trouble of inputting the configuration information upon changing of the apparatus configuration.

Preferably, the power supply control device according to the invention further comprises an input device for inputting the configuration information to the calculator, the calculator being operable to calculate the amount of power consumption of the apparatus based on the configuration information inputted by the input device and the amount of power detected by the detector.

With such an arrangement, a means for automatically recognizing the connection of the configuration units can be used as the input device, thus enabling the omission of troublesome configuration information inputting operation accompanying the configuration change. In addition, using the actually measured power consumption value for estimation of power serves for improved accuracy.

Preferably, in the power supply control device according to the invention, the storage element stores a configuration unit of those components which are likely to be changed in the configuration of the apparatus.

Accordingly, the amount of configuration information to be stored in the storage element can be reduced to a minimum, and hence the required storage capacity can be minimized, and the input procedure of inputting to the storage element can be simplified.

Preferably, the controller comprises a comparator for making a comparison between the amount of power consumption calculated by the calculator and a power supply capacity of the power supply, and a control operation element for performing a predetermined control operation based on the result of comparison performed by the comparator.

According to this arrangement, based on the comparison result of the comparator, the control operation element can display an amount of shortage or surplus of the power supply capacity, for example. Furthermore, in spite of the fact that the power supply capacity provided is less than the power consumption of the apparatus, when power is turned on, the control operation element can operate to stop the whole power supply; alternatively it supplies power to a part of the configuration, e.g., those configuration portions existing before the configuration change; alternatively, where the apparatus configuration is divided into a main system and a sub system, the control operation element can also operate to supply power to the main system alone. In this manner, it is possible to prevent the occurrence of serious situations such as data loss and the like.

Preferably, the power supply control device according to the invention further comprises a power supply capacity calculator for calculating the power supply capacity of the power supply based on the configuration information on each power supply configuration unit constituting the power supply and an available power supply capacity which is able to be supplied by each power supply configuration unit. The comparator makes a comparison between the power supply capacity calculated by the power supply capacity calculator and the amount of power consumption.

With this arrangement, where the power supply can be constructed of a plurality of power supply blocks, the entire power supply capacity can readily be calculated, and the apparatus can be equipped with the power supply having the optimal power supply capacity corresponding to its power consumption.

According to another aspect of the present invention, there is provided an apparatus comprising: a main unit having at least one processing functional block for processing information; a power supply unit having at least one power supply functional block for supplying electric power to the processing functional block; and a power supply control device including a controller for calculating an amount of power consumption of the apparatus proper based on configuration information of the processing functional block and an amount of power consumed by each power supply functional block, the controller calculating an amount of power supplied by the power supply unit based on the configuration information of the power supply functional block and an amount of power supplied to each power supply functional block, the controller performing a predetermined processing in accordance with the amount of power consumed by the main unit thus calculated and the amount of power supplied by the power supply unit thus calculated.

According to this arrangement, the power consumption of the entire apparatus can be calculated, for example, from or based on a total sum of the respective power consumption values of all the configuration units constituting the apparatus. This serves to predict the power consumption more easily and more accurately in comparison with the prior art. Thus, if the power consumption is displayed directly, or compared with the power supply capacity to display a difference therebetween for example, it will be possible to exactly grasp a shortage or surplus of the power supply capacity, and hence an excellent apparatus will be provided which can avoid having a power supply unit of an unnecessarily large power supply capacity or an insufficient power supply capacity.

Preferably, the apparatus according to the invention further comprises a detector for detecting an amount of power outputted from the power supply unit to the main unit during operation of the apparatus. The controller performs the predetermined processing in accordance with the detection result of the detector.

According to this arrangement, the power consumption of the apparatus can be calculated using the actually measured value of the power actually consumed by the apparatus, so the accuracy of the power consumption thus calculated can be improved.

According to a further aspect of the present invention, there is provided a computer-readable medium having a program recorded thereon. The program is executed by a computer so that the computer is operated to calculate an amount of power consumed by a device, which is supplied with electric power from a power supply, based on configuration information on each configuration unit constituting the device and an amount of power consumed by each configuration unit. The computer further operate to perform a predetermined processing based on the amount of power consumption thus calculated.

Thus, when a computer performs a reliable prediction of the power consumption of the device after the configuration change, for example, the medium can readily be supplied to the computer.

According to a still further aspect of the present invention, there is provided a data recording medium which is readable by a computer. The medium stores configuration units constituting a device, which is supplied with electric power from a power supply, and an amount of power consumed by the configuration units as power consumption information. The medium retrievably stores the configuration units constituting the device and an amount of power consumption corresponding to each configuration unit, in order that a computer can calculate a power consumption of the device based on the configuration information and the power consumption information and performs a predetermined processing based on the power consumption value thus calculated.

According to such a data recording medium, where the power consumption in the device is estimated reliably by a computer, data of configuration units and corresponding power consumption values of the device can readily be supplied to the computer through the data recording medium.

The above and other objects, features and advantages of the present invention will become apparent from the following detailed description of several preferred embodiments of the invention taken in conjunction with the accompanying drawings.

BRIEF DESCRIPTION OF THE ACCOMPANYING DRAWINGS

FIG. 6 is a view showing a configuration information table;

FIG. 7 is a view showing a power consumption information table;

FIG. 8 is a view showing a power supply configuration information table;

FIG. 9 is a view showing a power supply capacity information table;

DESCRIPTION OF THE PREFERRED EMBODIMENTS

Figure 1:
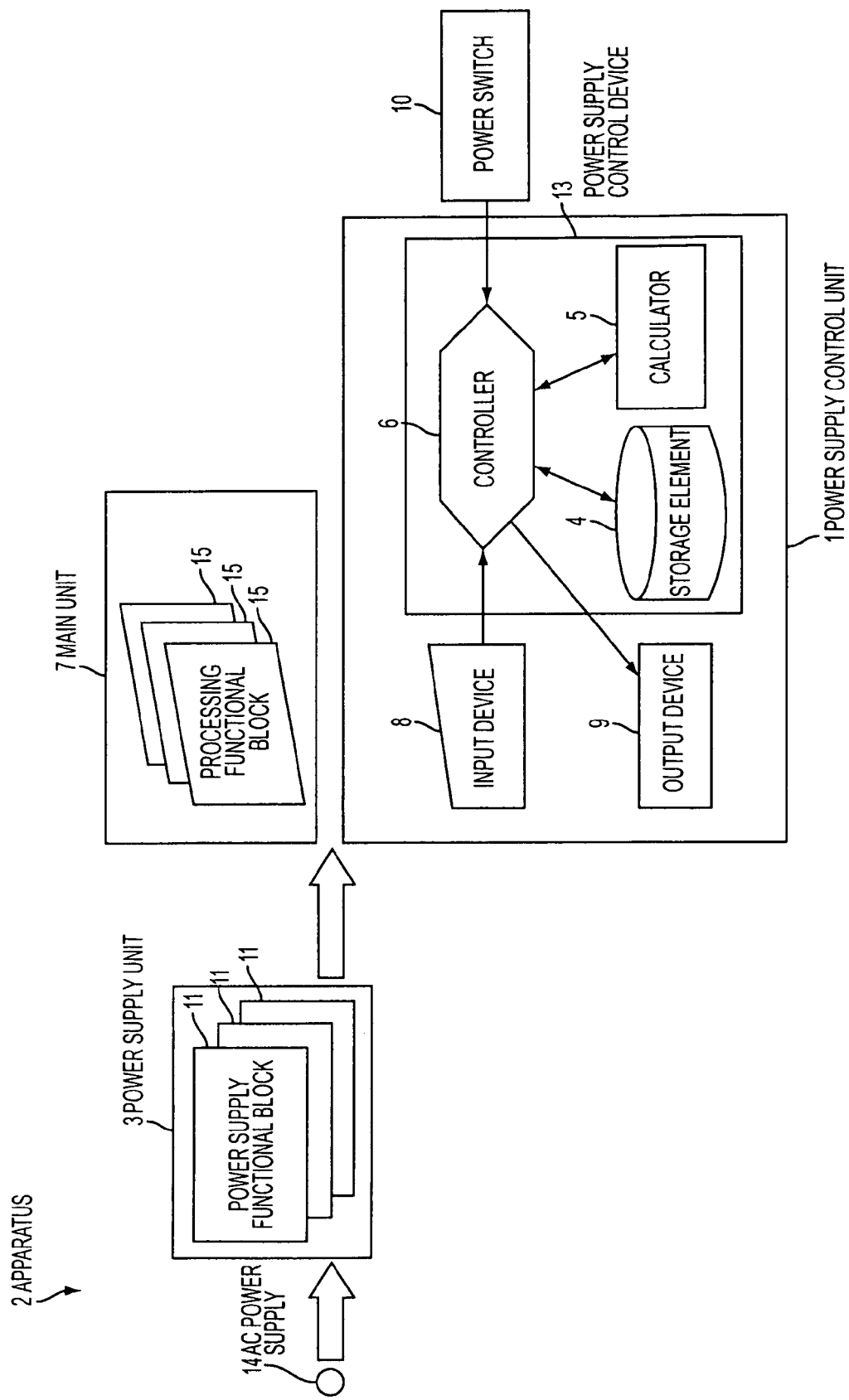
FIG. 1 is a block diagram showing a first basic configuration according to the present invention.

Now, one example of a first basic configuration according to the present invention is illustrated in FIG. 1. The first basic configuration is constructed such that a power supply control device of the invention calculates the power consumption of a apparatus 2 (e.g., a apparatus in the form of a server apparatus) without using a detector such as a power sensor for detecting power.

The power supply control unit 1 shown in FIG. 1 includes a storage element 4 for storing prescribed information and disposed in the apparatus 2 to which power is suuplied from a power supply unit 3, a calculator 5 for calculating the power consumption of the apparatus 2 by use of the information stored in the storage element 4, and a controller 6 for controlling the storage element 4 and the calculator 5. The storage element 4, the calculator 5 and the controller 6 together constitute a power supply control device 13 of the power supply control unit 1.

Disposed in the apparatus 2 is a main unit 7 having an intrinsic function of the apparatus. The main unit 7 includes a plurality of processing functional blocks 15 which can be extendable upon field upgrading or the like. The controller 6 is provided with an output device 9 which serves as a processing means for generating a predetermined output in response to the result of calculations carried out by the controller 6. Also, the controller 6 is adapted to be connected to an input device 8 for inputting required information and a power switch 10 for the entire apparatus 2. The power supply unit 3 comprises, for example, a plurality of power supply functional blocks 11 connected to an alternating current (ac) power supply 14. The number of the power supply functional blocks 11 employed can be changed in accordance with a change in the configuration of the main unit 7.

In the above construction, the storage element 4 includes configuration information storing means (storing means) for storing configuration units constituting the apparatus 2 as configuration information, and power consumption storing means for storing an amount of power consumed by each configuration unit as power consumption information. The configuration information can be input by the input device 8. The calculator 5 constitutes calculating means for calculating the power consumption of the apparatus 2 based on the configuration information and the power consumption information.

Figure 2:
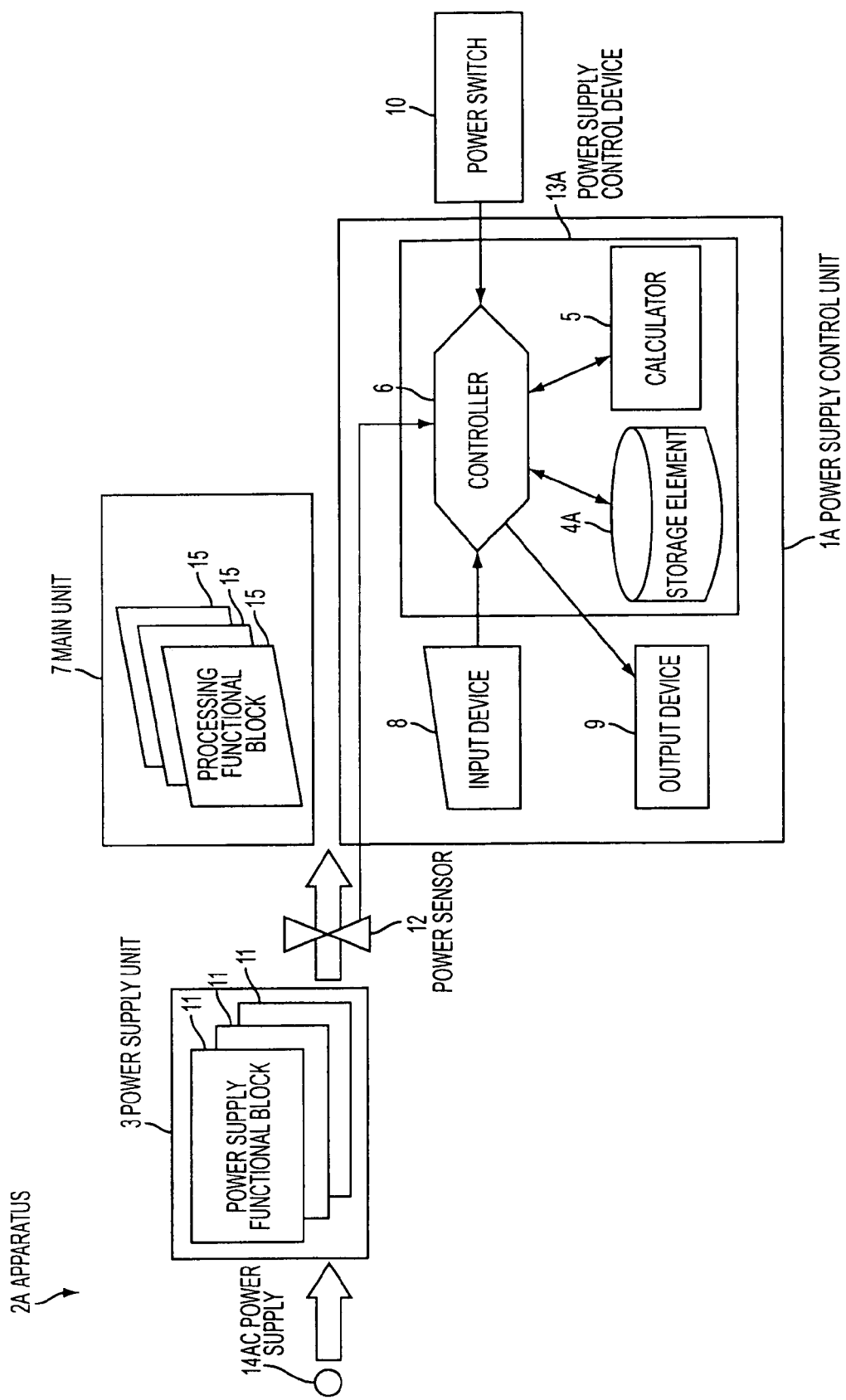
FIG. 2 is a block diagram showing a second basic configuration according to the present invention.

One example of a second basic configuration according to the present invention is illustrated in FIG. 2. The second basic configuration is the case in which a power supply control unit 1A according to the invention has a detector in the form of a power sensor 12 for detecting power. The second basic configuration is constructed such that a calculator 5 of a power supply control device 13A calculates and predicts the power consumption of an apparatus 2A after a change in the configuration thereof, using the configuration information, the power consumption information and the amount of power detected by the power sensor 12. The power sensor 12 detects and the amount of power supplied from the power supply unit 3 to the apparatus 2A. The amount of power thus detected is stored in a storage element 4A which constitutes a power value storing means, and is used as required upon changing of the configuration of the apparatus 2A or the like.

Though with the first and second basic configurations as described above, the power supply control units 1, 1A are provided in the apparatus 2, 2A, respectively, they may of course be provided separately or independently from the apparatus 2, 2A.

Now, preferred embodiments of the present invention will be described in detail while referring to the accompanying drawings.

Embodiment 1

A first embodiment of the invention is a case in which a first basic configuration of the invention is applied to an apparatus in the form of a server apparatus.

Figure 3:
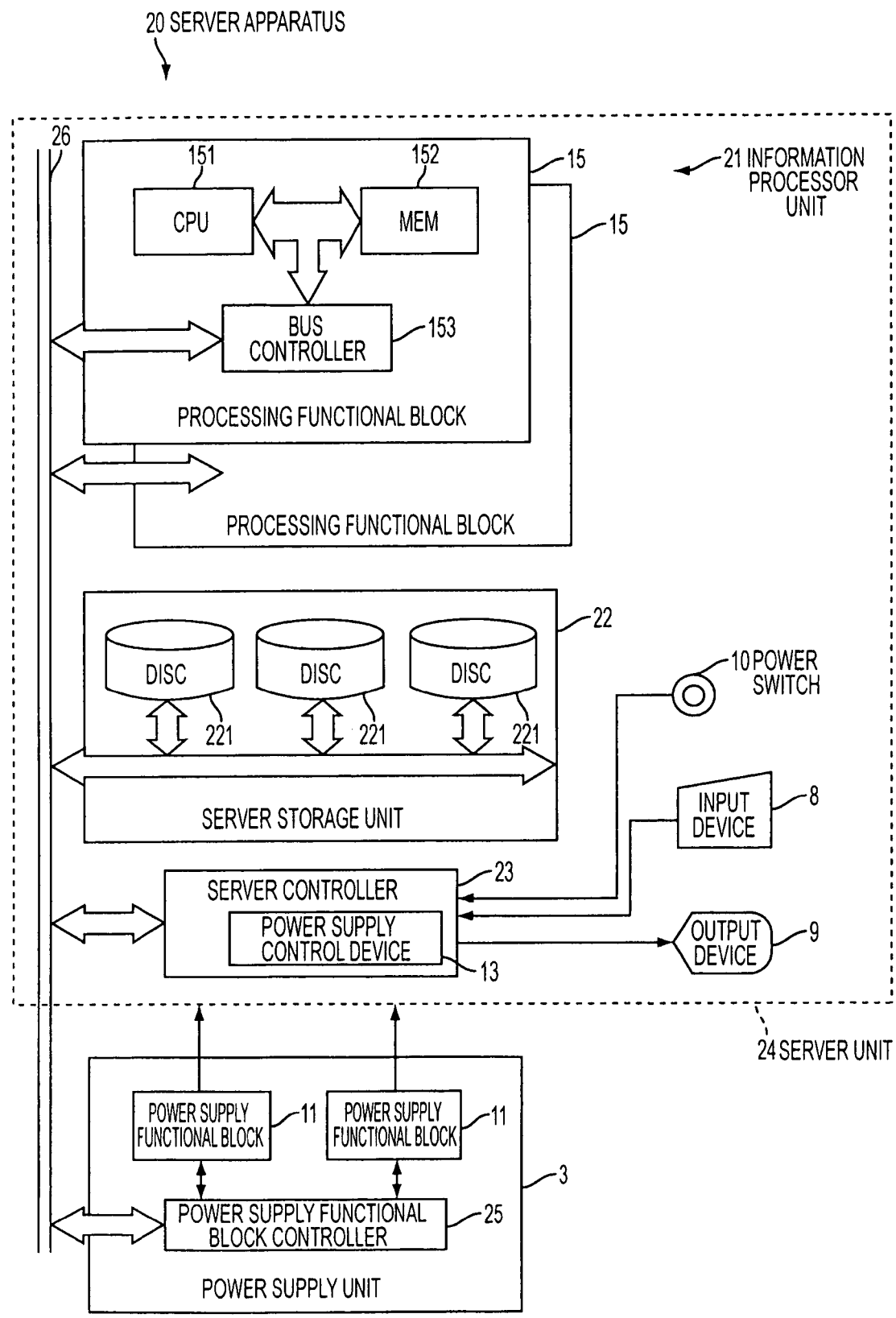
FIG. 3 is a block diagram showing a server apparatus according to a first embodiment of the invention.
Figure 4:
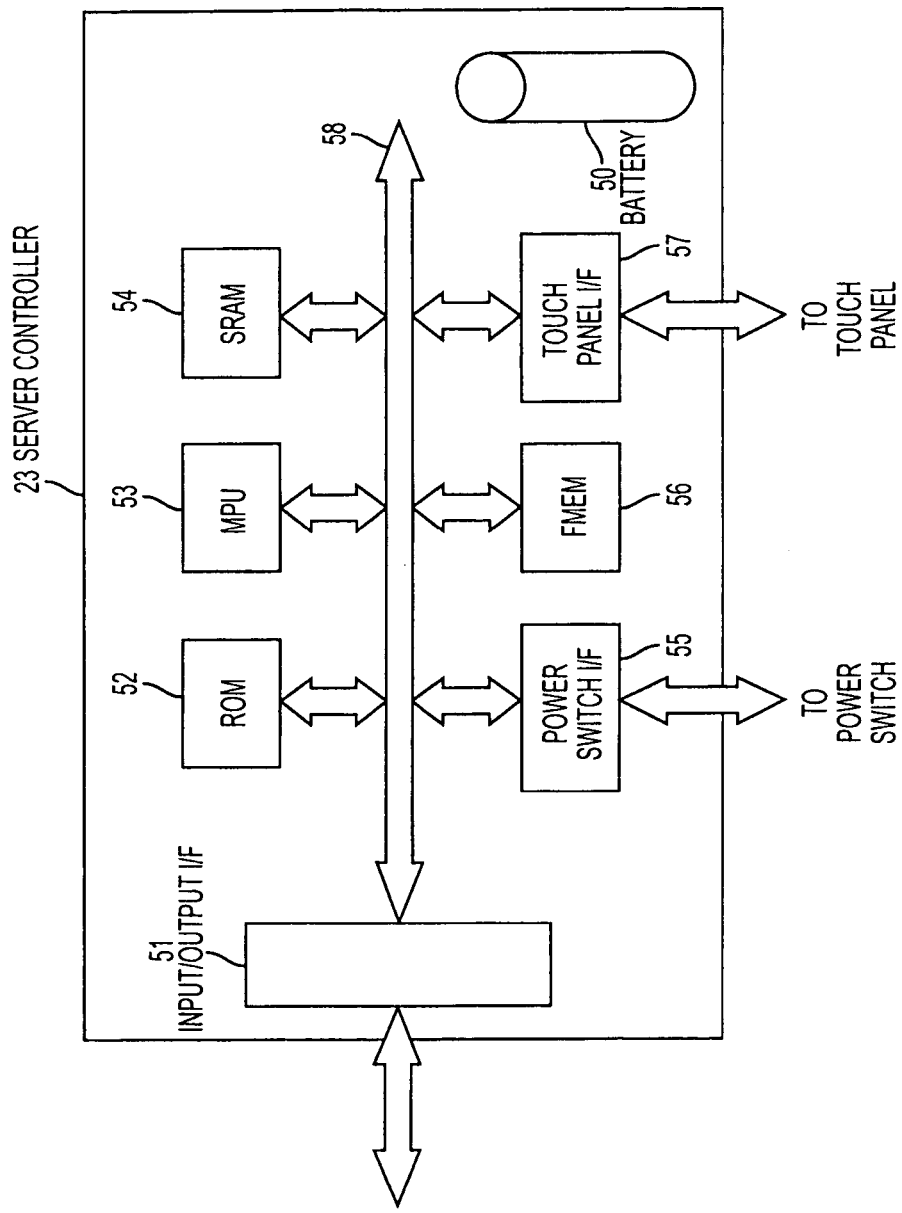
FIG. 4 is a block diagram showing the configuration of a server controller.

FIG. 3 is a block diagram showing the configuration of the server apparatus;

FIG. 4 is a block diagram showing a server controller; and

Figure 5:
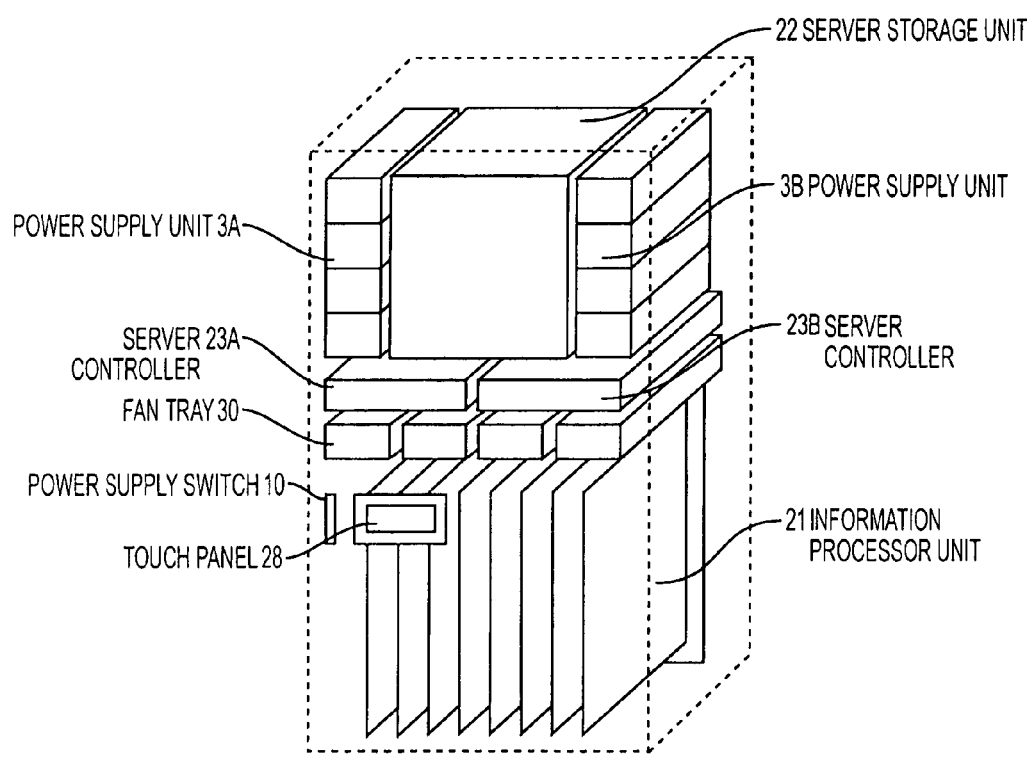
FIG. 5 is a perspective view showing an appearance of the server apparatus according to the first embodiment of the invention.

FIG. 5 is a perspective view showing an external appearance of the server apparatus.

In this embodiment, the power supply control device 13 of the power supply control unit 1 illustrated in FIG. 1 is constructed of a server controller 23 of the server apparatus.

As shown in FIG. 3, the server apparatus 20 includes an information processor unit 21 for processing information, a server storage unit 22 for storing information and the like, a server unit 24 with the server controller 23 for controlling the information processor unit 21 and the server storage unit 22, and a power supply unit 3 for supplying electric power to the server unit 24. The server controller 23 also constitutes the power supply control device 13 of the power supply control unit 1 as shown in FIG. 1. Connected to the server controller 23 are the input device 8, the output device 9 and the power supply switch 10.

The information processor unit 21 includes a plurality of processing functional blocks 15 each of which comprises a CPU 151, a memory 152, and a bus controller 153. The server storage unit 22 has a plurality of disc drives 221. Further, the power supply unit 3 has a power supply functional block controller 11 for selectively using some of the plurality of power supply functional blocks 11. The information processor unit 21, the server storage unit 22, the server controller 23 and the power supply unit 3 are connected to one another through the buses 26.

FIG. 4 illustrates one example of the configuration of the server controller 23 shown in FIG. 3. The server controller 23 comprises an MPU 53 for processing, a ROM 52 for storing processing programs for the MPU 53, a power consumption information table and the like, an SRAM 54 functioning as a main memory of the MPU 53, an FMEM 56 in the form of a flash memory for storing configuration information and power supply capacity information, an input and output interface (I/F) 51, a power switch interface (I/F) 55 for connection with the power switch 10, a touch panel interface (I/F) 57 for connection with a touch panel 28 (see FIG. 5) having an input and output function, a battery 50 for supplying power to the server controller 23 even when the power supply to the server proper is interrupted, and buses 58 for connecting the above elements with one another.

FIG. 5 shows an overall appearance and construction of the above-mentioned server apparatus which, according to the present embodiment, has dual systems each comprising the power supply unit 3 and the server controller 23 as depicted in FIG. 3, that is, it comprises a main power supply unit 3A, a sub power supply unit 3B, a main server controller 23A, a sub server controller 23B, a server storage unit 22, a fan tray 23, an information processor unit 21, a power switch 10 and an input device 8 in the form of a touch panel 28.

Such a dual formation of the power supply unit 3 and the server controller 23 each comprising a main element and a sub element can provide a redundant system. The main system is indispensable for the server apparatus but the sub system can be optionally selected as necessary. Also, each of the power supply units 3A, 3B comprises four power supply functional blocks 11 at maximum, with the number of the blocks being variable from one to four as required. The information processor unit 21 comprises eight processing functional blocks 15 at maximum, with the number of the blocks being variable from one to eight as required. The touch panel 28 comprises a liquid crystal touch display which has a dual function of serving as a display device (output device 9) and an input device 8 through which the configuration information of the device can be input or an indication of shortage or surplus in the power supply capacity or the like can be made.

In the following, the power control operation of the server apparatus will be described while taking one example thereof. In this example, the server apparatus is constructed of one server controller 23, four processing functional blocks 15, and three power supply functional blocks 11. The user beforehand inputs the type and number of these configuration units as configuration information from the touch panel 28 so as to store them into the FMEM 56 of the server controller 23, as shown in FIG. 4. An example of a table including such configuration information is illustrated in FIG. 6. In this connection, it is to be noted that the magnitude of power (standardized value) of each configuration unit during its operation is stored as a power consumption information table in the ROM 52. One example of such a power consumption information table is illustrated in FIG. 7.

The MPU 53 reads out from the power consumption table stored in the ROM 52 a corresponding power consumption value for each type of configuration unit stored in the FMEM 56, and add the power consumption value thus read out for the number of each configuration unit to thereby compute the total power consumption value of the current or existing configuration. In this regard, it is possible to input from the touch panel 28 the value of power (standardized value) at the time of operation of each configuration unit like the type and number thereof without using the power consumption table stored in the ROM 52.

Moreover, the configuration information of the power supply functional block 11 (power supply configuration information) is also input from the touch panel 28 to be stored in the FMEM 56 in the same manner. An example of such a power consumption table including the power supply configuration information is shown in FIG. 8. In this regard, note that a maximum power supply value for each one of the respective power supply functional blocks is beforehand stored in the ROM 52 as a power supply capacity information table. An example of such a table is illustrated in FIG. 9. The MPU 53 reads out from the power consumption information table in the ROM 52 a power consumption value corresponding to each type of configuration unit stored in the FMEM 56, and adds it up by the number of components for each type of configuration unit to thereby compute the maximum power supply value (power supply capacity) for the current configuration.

At this time, when the configuration of the device is to be changed, e.g., when four processing functional blocks 15 of the same type is to be added concretely, information on the addition of the four processing functional blocks 15 is input through the touch panel 28 with the power supply to the device proper being cut off. Alternatively, the entire configuration information after the change, i.e., changing the number of the processing functional blocks 15 to eight may be directly input. In this connection, if some means for automatically recognizing the mounting condition of each configuration unit is provided as described later, the manual operation of inputting the configuration information could be eliminated at all.

Here, the MPU 53 reads out from the power consumption table stored in the ROM 52 the power consumption values for the respective configuration units based on the configuration information before the configuration change previously stored in the FMEM 56 and the freshly input configuration information to thereby compute a total power consumption value after the configuration change. In this example, if the power consumption for each of the processing functional blocks 15 stored in the power consumption table of the ROM 52 is 240 W (48V and 5 A), it is predicted that the power consumption will be increased from the initial or unchanged configuration state by 960 W (20 A) due to the addition of four blocks. In addition, the MPU 53 determines whether the predicted power can be supplied by the current or existing configuration of the power supply unit 3.

In this example, assuming that one power supply functional block 11 can generate power of +48V and 20 A (DC), i.e., 960 W from a commercial power supply of 200V (AC), three power supply functional blocks 11 has a capacity of supplying a maximum power of 2880 W (60 A).

In the case where the power consumption before the configuration change is found to be 2400 W from the configuration information stored in the FMEM 56, the MPU 53 determines that the capacity of the power supply required is 3360 W (70 A) which is obtained from the power consumption before the configuration change of 2400 W added by an expected amount of increase. Then, the thus computed power consumption is compared with the capacity of power supply capable of being supplied. Since there is no alteration in the configuration of the power supply unit 3 before and after the configuration change and the available capacity of the power supply is found to be 2880 W (60 A) at maximum from the configuration information written into the FMEM 56, the MPU 53 determines that the power supply capacity now required can not be satisfied, and hence if a power turn-on command is input by the user, such a command is rejected, informing the touch panel 28 to that effect. Alternatively, the power supply may be turned on, while supplying no power to the four newly added processing functional blocks. Moreover, alternatively, the information about power supply priority can be stored in advance in the ROM 52, so that the MPU 53 operates to supply power based on the power supply priority, thereby cutt6ing off the power supply to part of the blocks.

Moreover, in the same server apparatus, when the configuration thereof is to be changed by reducing three blocks from the processing functional blocks 15, the user inputs into the touch panel 28 a command or instruction of reducing three blocks from the processing functional blocks 15 with the power supply to the device proper being cut off. Or, the entire configuration information after the configuration change, i.e., the fact that the number of the processing functional blocks 15 has been reduced to one, may instead be input. In this example, assuming that the power consumption of one processing functional block 15 is 240 W (5 A), it will be predicted that the power consumption is decreased, due to the reduction of three blocks, by 720 W (15 A) from the state before configuration change.

The MPU 53 predicts that the total power consumption will be reduced from 2400 W (50 A) to 1680 W (35 A) based on the configuration information written in the FMEM 56 and the freshly input configuration information. Further, since it is known from the power supply configuration information written in the FMEM 56 that the available capacity of the power supply is 2880 W (60 A), the MPU 53 computes a surplus of 120 W (25 A) in the capacity of the power supply, and judges that one block can be cut off from the power supply functional blocks, thus displaying an indication to that effect on the touch panel 28. As a result, the user can adjust the number of the power supply functional blocks based on the indication on the touch panel 28, thus making it possible to improve the redundant configuration of the power supply unit.

Now, the flow of the above-mentioned processing will be described below while referring to a flow chart shown in FIG. 10.

Figure 10:
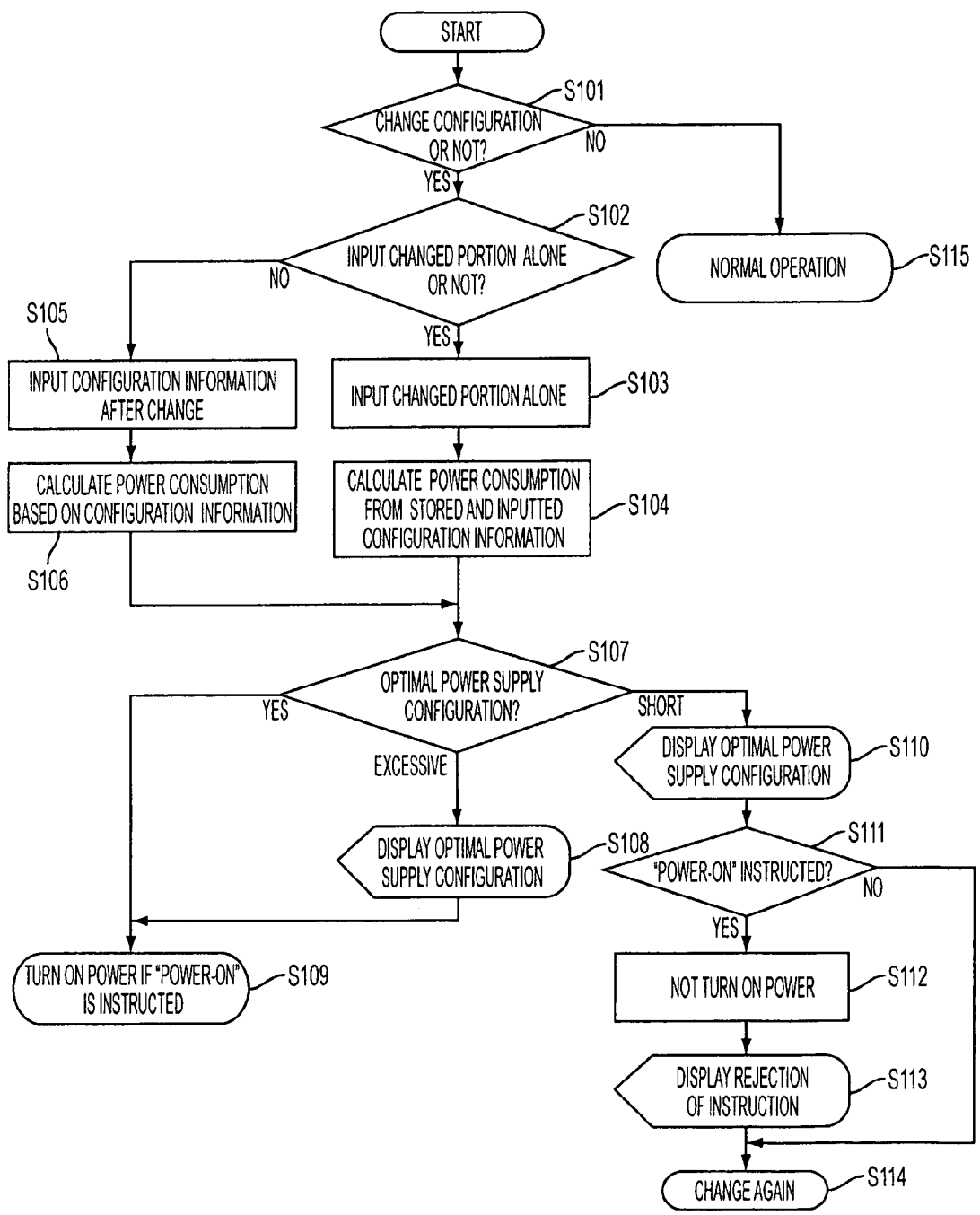
FIG. 10 is a flow chart showing an operation of the first embodiment.

The flow chart of FIG. 10 illustrates that a power consumption value is predicted based on a piece of configuration information inputted by the user.

First, when the user wants to change the apparatus configuration ("YES" in step S101), he or she inputs configuration information on a change in the apparatus configuration through the touch panel 28. At this time, in the case where the information of the change in the configuration alone is input ("YES" in step S102), the type and increased or decreased number of blocks to be changed is input (S103), and the MPU 53 reads out from the power consumption information table stored in the FMEM 56 respective corresponding power consumption values based on the configuration information before the change and the changed configuration freshly inputted, and performs arithmetic operations or calculations to obtain a suitable power consumption values (S104).

Specifically, in the case where the number of the processing functional blocks is to be increased as in the above example, the power consumption value before the configuration change is 2400 W (50 A) and the power consumption value for the changed configuration portion is 960 W (20 A), so the power consumption value after the configuration change is computed to be 1680 W (35 A). In addition, when the configuration information about the entire apparatus after the configuration change is input in addition to the configuration portion to be changed ("NO" in step S102), the configuration information after the configuration change is input (S105), on the basis of which a suitable power consumption value is computed while referring to the configuration information table stored in the ROM 52 (S106).

The power consumption value thus computed is compared with the power supply capacity (S107). When the available power supply capacity is less than the computed power consumption value (less than the required value in step S107), an optimal power supply capacity is displayed on the touch panel 28 (step S110). In this case, if the power consumption value computed in the above manner is 3360 W (70 A), a shortage of the power supply capacity being 480 W (10 A) may be indicated, or an optimal number of the power supply functional blocks being four may be indicated, or addition of one more power supply functional block may be indicated.

Moreover, if the user gives a "power on" instruction ("YES" in step S111), the MPU 53 does not turn on the power supply (S112), but displays on the touch panel 28 an indication of the "power on" instruction being not accepted (S113). With such an indication, the user is required to change the apparatus configuration once again (S114). If there is no "power on" instruction ("NO" in step S111), the user is required to change the device configuration again based on the indication in step S110 (S114).

On the contrary, when the power supply capacity is excessive ("excessive" in step S107), an optimal power supply capacity is displayed on the touch panel 28 (S108). When the power consumption value as computed in the above manner is 1680 W (35 A), a surplus of the power supply capacity being 1200 W (25 A) may be displayed, or an optimal number of the power supply functional blocks being three may be displayed, or one of the power supply functional blocks capable of being reduced may be displayed. Further, if the user gives a "power on" instruction, power is turned on (S109).

Furthermore, when the power supply capacity is an optimal value without any shortage or surplus ("YES" in step S107), nothing is displayed on the touch panel 28, and if a "power-on" instruction is given by the user, power is turned on (S109).

Here, note that there is no change in the apparatus configuration ("NO" in step S101), it is unnecessary to check the power supply capacity, thus permitting the apparatus to operate normally (S115).

Embodiment 2

In the first embodiment, the user inputs configuration information through the input device in the form of the touch panel 28, but in the second embodiment, reference will be made to the case in which input is automatically made by using a means for automatically recognizing respective configuration units mounted on the server apparatus itself through execution of a program.

In this case, the MPU 53 recognizes the types of the respective configuration units mounted on the server apparatus, reads out power consumption values corresponding to the types of configuration units thus recognized while referring to the configuration information table stored in advance in the ROM 52, and computes the power consumption value of the existing configuration through arithmetic processing. Thus, in this case, user's input operation for inputting configuration information becomes unnecessary.

Such an automatic recognition means may be JTAG and the like, for example. Any JTAG compliant CPU can recognize CPU modules and the like. Basically, whether a module is mounted or not can be determined by reading out a readable identification code (ID) built in an LSI mounted on each module. An example of bit configuration for such an ID is illustrated in FIG. 11.

Figure 11:
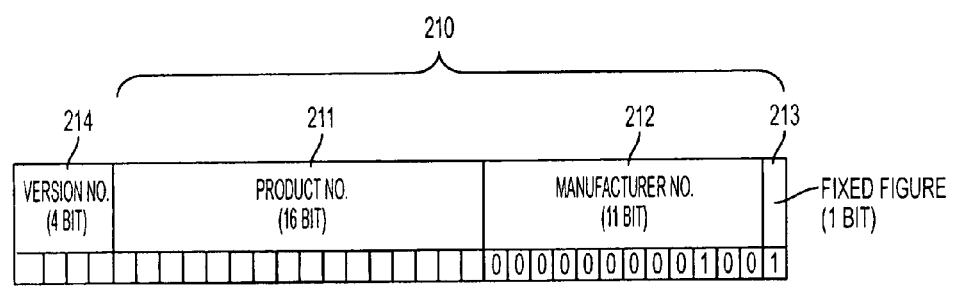
FIG. 11 is a view showing a bit configuration of ID in JTAG.

As shown in FIG. 11, the ID includes a piece of fixed information 210 and a piece of variable information 214. The fixed information 210 has a type number 211 of 16 bits, a manufacturer number 212 of 11 bits, and a fixed figure 213 of 1 bit, according to which the manufacturer and type of a module can be determined, thus making it possible to recognize the presence of the module. Further, the variable information represents the version number or the like of an LSI, which makes it possible to identify the LSI version, thus enabling the user to know the level of the module.

In addition, the automatic recognition means may be of an electrical recognition type. For example, for the recognition of a memory module or the like, signal wiring for such a module can be arranged on a printed circuit board so that the signal level of signal wiring is electrically varied when the module is mounted on the printed circuit board, so that it can be determined whether the module is mounted or not. The wiring on the printed circuit board is equipped with a pull-up means or the like, so that upon mounting of a module, the wiring can be short-circuited to ground on the module side. As a result, it appears that in the absence of such a module, the wiring is of the high level, but upon mounting of the module, the wiring turns to the low level. Such a difference or change in the electrical signal level can be recognized, and hence the presence of the module can be ascertained.

Although there are various methods other than the above for the automatic recognition means, using one of such methods can omit user's operation of inputting configuration information, which is of very convenience.

Figure 12:
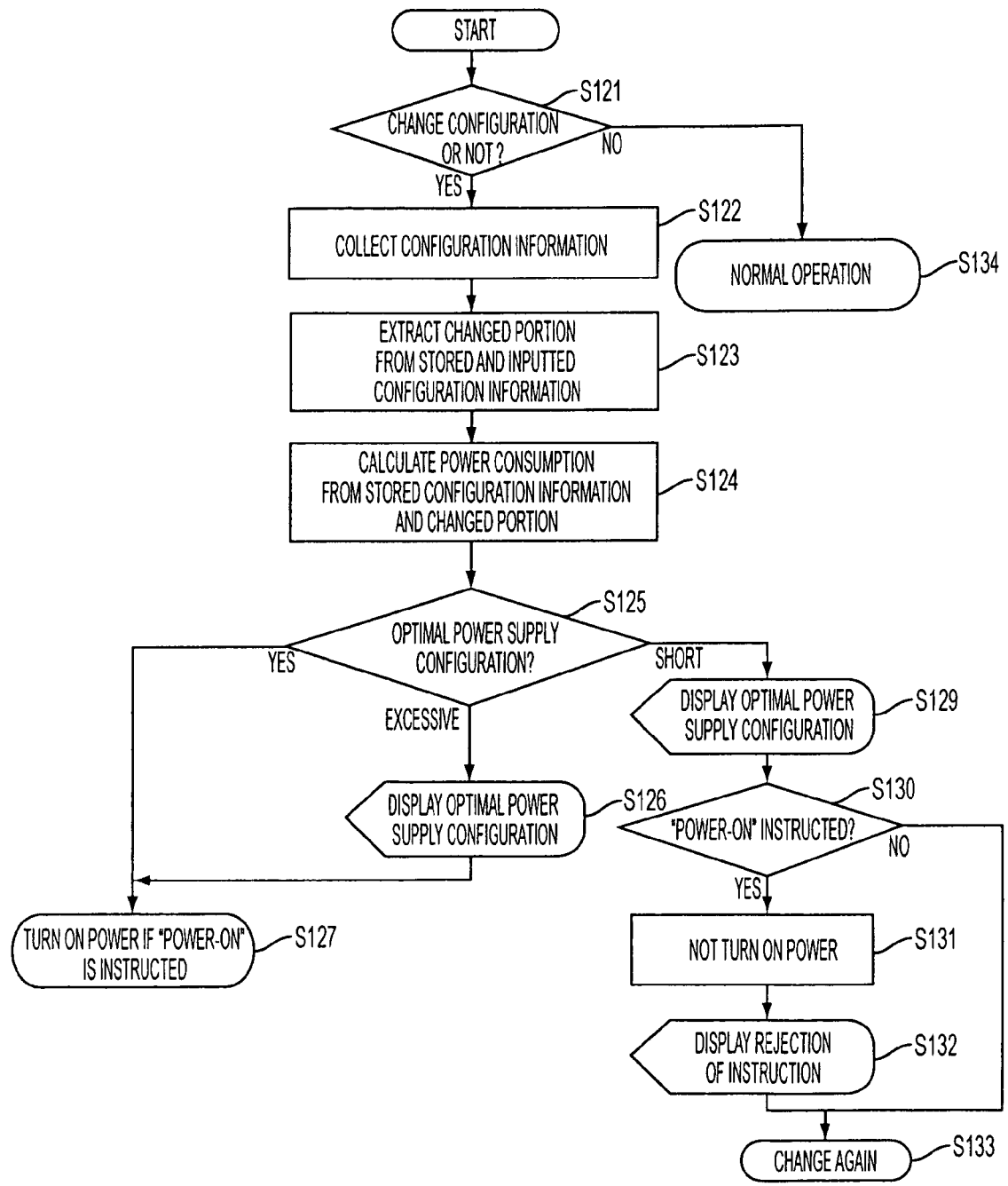
FIG. 12 is a flow chart showing an operation of the second embodiment.

FIG. 12 is a flow chart illustrating the case in which a means for automatically recognizing the apparatus configuration is employed so that a power consumption value is predicted based on the configuration information collected by the automatic recognition means.

First, when the apparatus configuration is to be changed ("YES" in step S121), the configuration information is automatically collected (S122). The MPU 53 extracts a portion of the configuration information to be changed based on the configuration information before such a change stored in the FMEM 56 and the freshly collected configuration information (S123). Based on the configuration information before the change and the configuration information portion to be changed, the MPU 53 computes the power consumption through addition processing while referring to the power consumption information table stored in the ROM 52 (S124). The power consumption value thus computed is compared with the power supply capacity (S125). Thereafter, steps from S125 to S133 follow, which are the same as the steps from S107 to S114 which have been described above with reference to FIG. 10, and hence a description of these steps is omitted here.

Although in FIG. 12, only the portion of the apparatus configuration to be changed is extracted (S123), respective power consumption values obtained from the configuration information itself collected in step S122 can be added up to compute an overall power consumption value of the entire device.

Embodiment 3

A third embodiment of the present invention is the case where the power supply control device of the second basic configuration shown in FIG. 2 is applied to a server apparatus.

Figure 13:
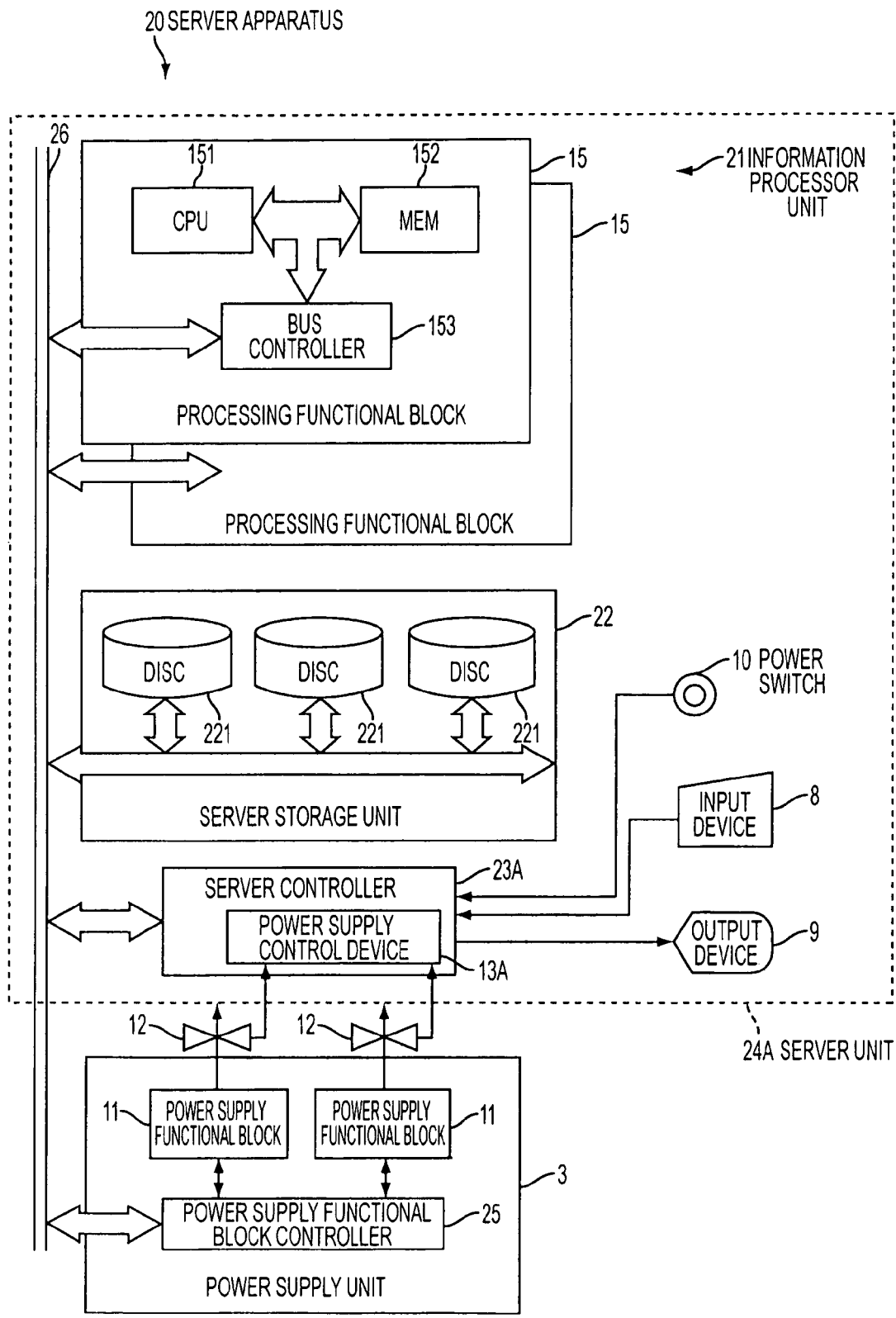
FIG. 13 is a block diagram showing a server apparatus according to a third embodiment of the present invention.
Figure 14:
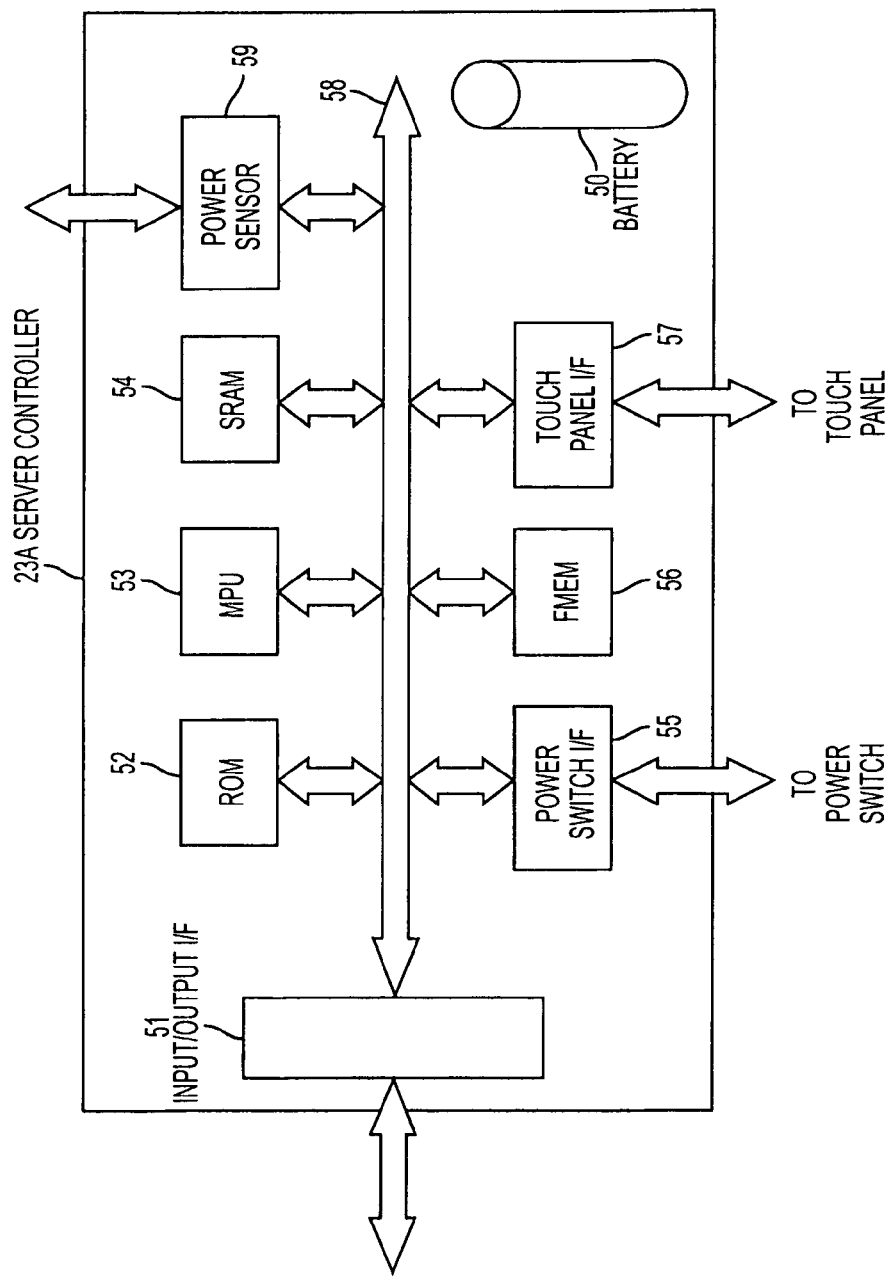
FIG. 14 is a block diagram showing a server controller according to the third embodiment.

FIG. 13 is a block diagram showing the server apparatus according to the third embodiment, and FIG. 14 shows a server controller. Here, note that in these figures, the like references as in FIGS. 3 and 4 designate the same or corresponding parts.

In the third embodiment, as shown in FIG. 13, provision is made for a power sensor 12 disposed between the power supply unit 3 and the server unit 24A for sensing the amount of power supplied from the power supply unit 3 to the server unit 24A. Also, as illustrated in FIG. 14, a power sensor interface (I/F) 59 is provided on the server controller 23A. In the third embodiment, the total power consumption of the server unit 24A is measured in advance by the power sensor 12, and the result of the measurement is stored in the FMEM 56 under the control of the MPU 53. Due to the provision of the power sensor 12, it is possible to accurately know the actual power consumption values of the respective configuration units instead of the standard values thereof. Also, it becomes possible to know the total power consumption value without grasping all the configuration of the current apparatus.

The operation of this embodiment, i.e., power supply control operation when the device configuration is changed, e.g., increased or decreased, is substantially similar to that of the first embodiment. The third embodiment differs from the first embodiment in that the power consumption value of the current device configuration to be first stored is the value measured by the power sensor 12, whereby on the basis of the actually measured accurate value, it is possible to predict the power consumption value after the configuration change. Still further, the measurement of the power sensor 12 without grasping the power consumption of each of all the configuration units in the initial stage permits the user to know the total power consumption value.

Moreover, another advantage with the provision of the power sensor 12 is that measurements of power can be effected at predetermined intervals during operation of the device in addition to the initial stage while taking into consideration that the power consumption value can be varied under unstable operating conditions even with the device configuration being unchanged. In this case, it is possible to always monitor the power consumption of the device so as to prevent the power consumption from exceeding the power supply capacity in such a manner that when the power measured during the device operation exceeds a prescribed value, some appropriate measure is taken such as interrupting power to be supplied to a sub system control device and the like. In this manner, shutdown of the device can be avoided. If the actually measured values are kept stored for a certain period of time, it becomes possible to check at what point in time there took place a fault in the apparatus. This is useful in the sense of monitoring the stable operating condition of the apparatus.

Now, the operation of the third embodiment will be described below while referring to a flow chart shown in FIG. 15.

Figure 15:
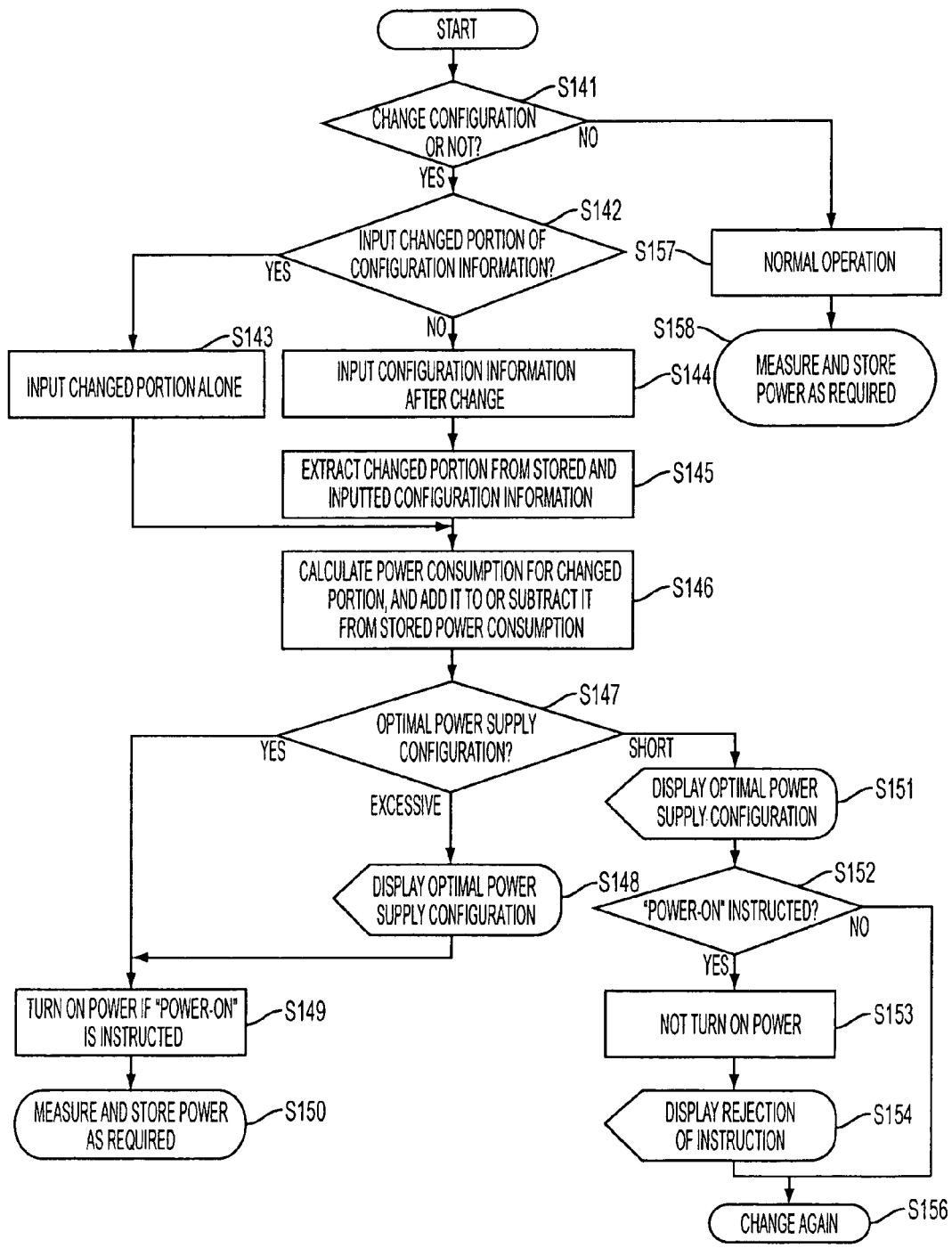
FIG. 15 is a flow chart showing an operation of a fourth embodiment of the present invention.

FIG. 15 is the flow chart illustrating how to predict the power consumption value based on the configuration information inputted by the user.

First, when the user changes the apparatus configuration ("YES" in step S141), he or she inputs the configuration information relating to a configuration change through the touch panel 28. In this case, when information on those portions of the apparatus configuration to be changed alone is to be input ("YES" in step S142), the type and the number of increase or decrease of the blocks to be changed are input (S143). The MPU 53 reads out from the power consumption information table stored in the ROM 52 respective power consumption values corresponding to the input configuration information on the configuration to be changed, and computes the power consumption value for the configuration to be changed by adding up the respective power consumption values. The thus computed power consumption value is added to or subtracted from the power consumption value (measured value) before the configuration change stored in the FMEM 56 to provide the power consumption value required after the configuration change (S146).

In the case where the number of processing functional blocks is increased as in the example shown in the first embodiment, the power consumption value in the configuration information before the configuration change is 2400 W (50 A), and the power consumption value for the configuration to be changed is 960 W (20 A), thus computing the power consumption value after the configuration change of 3360 W (70 A). On the other hand, when the number of blocks is reduced, the power consumption value for the changed or reduced blocks is 720 W (15 A), thus computing the power consumption value after the configuration change of 1680 W (35 A). Further, in the case where the configuration information on the entire device after the configuration change is input instead of the configuration information on the changed configuration alone ("NO" in step S142), the configuration information after the configuration change is input (S144), so that the configuration information for the changed configuration is computed from the configuration information stored in the FMEM 56 and the freshly input configuration information (S145). That is, a difference between these configuration information is the changed configuration. In this regard, note that in this case, it is required to previously store in the FMEM 56 the configuration information in addition to the power consumption value before the configuration change.

Here, as described above, based on the configuration information thus computed, the MPU 53 reads out from the power consumption information table the respective power consumption values corresponding to the configuration information for the changed configuration, and computes the power consumption value for the changed configuration by adding up the power consumption values thus read out. The thus computed power consumption value is added to or subtracted from the power consumption value before the configuration change stored in the FMEM 56 to provide the power consumption value after the configuration change (S146).

Thereafter, the power consumption value thus computed is compared with the power supply capacity (S147). When the available power supply capacity is less than the computed power consumption value ("less than the required value" in step S147), an optimal power supply capacity is displayed on the touch panel 28 (S151). In this case, if the power consumption value computed in the above manner is 3360 W (70 A), a shortage of the power supply capacity being 480 W (10 A) may be displayed, or the number of processing functional blocks being four may be displayed, or addition of one power supply functional block may be displayed. Further, if the user gives a "power-on" instruction ("YES" in step S152), the MPU 53 does not turn on the power supply (S153), but displays on the touch panel 28 an indication of the "power-on" instruction being not accepted (S154).

With such an indication, the user is required to change the apparatus configuration once again (S156). If there is no "power-on" instruction ("NO" in step S152), the user is required to change the apparatus configuration again based on the indication in step S151 (S156).

On the contrary, when the power supply capacity is excessive ("excessive" in step S147), an optimal power supply capacity is displayed on the touch panel 28 (S148). When the power consumption value as computed in the above manner is 1680 W (35 A), an indication that a surplus of the power supply capacity is 1200 W (25 A) may be displayed, or an indication that an optimal number of the power supply functional blocks is three may be displayed, or an indication that one of the power supply functional blocks is able to be reduced may be displayed. Further, if the user gives a "power-on" instruction, power is turned on (S149).

Furthermore, when the power supply capacity is an optimal value without any shortage or surplus ("YES" in step S147), nothing is displayed on the touch panel 28, and if a "power-on" instruction is given by the user, power is turned on (S149).

Here, note that there is no change in the apparatus configuration ("NO" in step S141), it is unnecessary to check the power supply capacity, thus permitting the apparatus to operate normally (S157).

Moreover, during the normal operation of the apparatus, power can be arbitrarily measured as required, and the measured values may be stored in the FMEM 56 (S150 and S158). That is, measurements of power can be effected at predetermined intervals during operation of the apparatus as well, so that the power consumption of the apparatus is always monitored to prevent the power consumption from exceeding the power supply capacity. The actually measured values are stored in the FMEM 56 as its records. Such processing serves to achieve stable operation of the apparatus.

Embodiment 4

A fourth embodiment of the present invention is the case in which in the second basic configuration as shown in FIG. 2, a means for automatically recognizing the configuration of the server apparatus is employed so that the power consumption value can be predicted based on the configuration information collected by the automatic recognition means.

Figure 16:
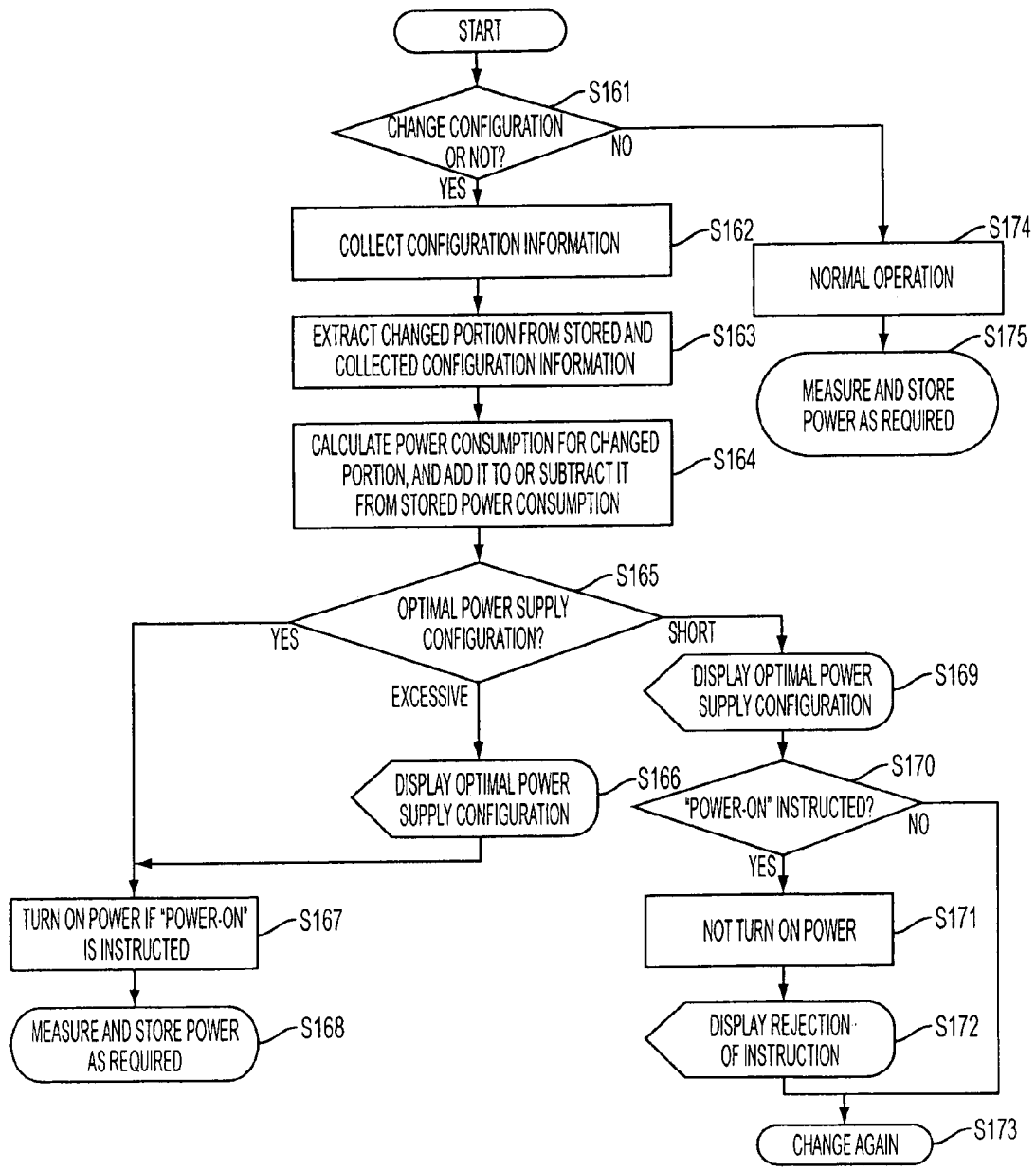
FIG. 16 is a flow chart showing an operation of a fifth embodiment of the present invention.

FIG. 16 is a flow chart illustrating the operation of the fourth embodiment.

Here, note that in the fourth embodiment, the configuration information before the configuration change is stored in the FMEM 56 in addition to the measured power consumption values.

First, when the apparatus configuration is to be changed ("YES" in step S161), the configuration information is automatically collected (S162). The MPU 53 extracts a portion of the configuration information to be changed on the basis of a difference between the configuration information before such a change stored in the FMEM 56 and the freshly collected configuration information (S163). The MPU 53 reads out from the power consumption information table the respective power consumption values corresponding to the configuration information for the changed configuration, and computes the power consumption value for the changed configuration by adding up the power consumption values thus read out. The thus computed power consumption value is added to or subtracted from the power consumption value before the configuration change stored in the FMEM 56 to provide the power consumption value after the configuration change (S164). Thereafter, steps from S165 to S173 follow, which are the same as the steps from S147 to S156 which have been described above with reference to the third embodiment, and hence a description of these steps is omitted here.

Embodiment 5

A fifth embodiment of the present invention will describe the manner in which in the above-mentioned embodiments, the apparatus is controlled to operate in the event that there arises a failure in the power supply functional blocks during operation of the apparatus.

In the first embodiment, as referred to above, the configuration information on the power supply capacity in addition to the processing functional blocks 15 is stored in the FMEM 56 (FIG. 4), as illustrated in FIG. 8. In this regard, the user may input the power supply functional blocks information (power supply configuration information) through the touch panel 28, similar to the processing functional blocks information (configuration information). Alternatively, provision may be made for a means of automatically recognizing the power supply functional blocks mounted on the server apparatus through the execution of a certain program.

The MPU 53 reads out power supply capacities respectively corresponding to the types of the power supply functional blocks from a power supply capacity information table stored in advance in the ROM 52 as shown in FIG. 9, and adds up the power supply capacities by the number of the power supply functional blocks to provide an available power supply value as a power supply capacity. Here, note that operation can be modified such that an available power supply value for each power supply functional block unit is input through the touch panel 28, similar to the type and number thereof, without using the power supply information table stored in the ROM 52.

Furthermore, each power supply functional block 15 is provided with an RAS function for notifying the MPU 53 of a fault of the own block 15. Upon notification of such a failure, the MPU 53 recalculates an available power supply capacity, and determines whether the operation of the main system is maintained or the entire power supply is cut off. For example, in the event that only one of the power supply functional blocks 11 has failed, the normally operating power supply functional blocks 11 are two, which results from the total of three blocks before the failure minus one fault block. In this case, in the first embodiment, one power supply functional block 11 can supply a power of 960 W (20 A), and hence the available power supply value is 1920 W (40 A).

Then, the MPU 53 compares the thus recalculated power supply capacity of 1920 W (40 A) with a separately calculated device power consumption value of 2400 W (50 A). If it is determined that the power supply capacity is short, the operation of the server apparatus may be stopped, or prescribed one(s) of the processing functional blocks 15 may be kept supplied with power, but not with the rest thereof. Alternatively, if an indication to that effect is displayed on the touch panel 28, the user can be notified of the details of such a power supply failure. Still further, such an operation for supplying power after the recalculation of the power supply capacity may be set by the user through the touch panel 28.

Although the foregoing description has been made of the operation of the device upon failure of one of the power supply functional blocks 11 in the first embodiment, the power supply in the third embodiment can also be controlled in the same manner. In this case, however, the power consumption value with which the MPU 53 compares the recalculated power supply capacity is not what is calculated but measured by the power sensor 12.

Embodiment 6

Although in the fifth embodiment, reference has been made to a power supply failure, the same processing as described above can be done with reference to a configuration change of the power supply functional blocks. A sixth embodiment of the present invention relating to such a case will be described below.

For example, in the first embodiment, in the case where the configuration of the power supply functional blocks 11 is changed (i.e., increased or decreased) after the power supply to the server apparatus has been turned off, information on the changed configuration (the types and number of the power supply functional blocks 11) is input through the touch panel 28. The changed configuration information may be only those portions of the power supply functional blocks 11 which are to be changed, or the power supply configuration information on the entire power supply functional blocks 11 after the configuration change. Based on the information thus input, the MPU 53 fetches an available power supply value (power supply capacity information) for the corresponding power supply type from a power supply capacity information table, as shown in FIG. 9, stored in advance in the ROM 52, and recalculates the power supply capacity required.

Thereafter, the power supply capacity thus recalculated is compared with the power consumption value so that power supply control can be carried out on the basis of the comparison result. For example, even if the user gives a "power-on" instruction, the MPU 53 rejects the "power-on" instruction and notifies the touch panel 28 to that effect. Alternatively, power is turned on, but no supply of power is made to prescribed one(s) of the processing functional blocks 15. Alternatively, information indicative of the priority for power supply is stored in advance in the ROM 52, and the MPU 53 prevents part of the power supply functional blocks from being supplied with power according to the priority. If the power supply capacity is excessive, power may be turned on while displaying an indication to that effect on the touch panel 28. On the other hand, if the power supply capacity is optimal, power is turned on without taking any other action.

In this connection, it is to be noted that if there is a change in the configuration of the processing functional blocks 15, a power consumption value is separately calculated and compared with the power supply capacity, as already described above.

Although the foregoing description has been made to the operation of the device upon a configuration change of the power supply functional blocks 11 in the first embodiment, the power supply in the third embodiment can also be controlled in the same manner. In this case, however, the power consumption value with which the MPU 53 compares the recalculated power supply capacity is not what is calculated but measured by the power sensor 12.

Embodiment 7

A seventh embodiment of the present invention will describe the case in which the configuration unit of the device is handled as the unit of module.

In the server apparatus as described above in the above-mentioned embodiments, power supply control is effected for the configuration unit of the device in the form of the unit of block, but according to this embodiment, each block is subdivided into a plurality of module units so that information on modules can be handled as configuration information. Thus, the configuration information on the modules can be input by the user through the touch panel 28, as in the case of the configuration information on the blocks.

For example, in the case where each of the processing functional blocks 15 as described above comprises a plurality of processing functional modules, the configuration information on the processing functional modules before a configuration change is stored in advance in the FMEM 56, and whenever a configuration change is to be made, the configuration information to be changed is input through the touch panel 28, based on which the MPU 53 can predict a power consumption value and control the power supply capacity.

Now, the above operation will be described below while referring to FIG. 17.

Figure 17:
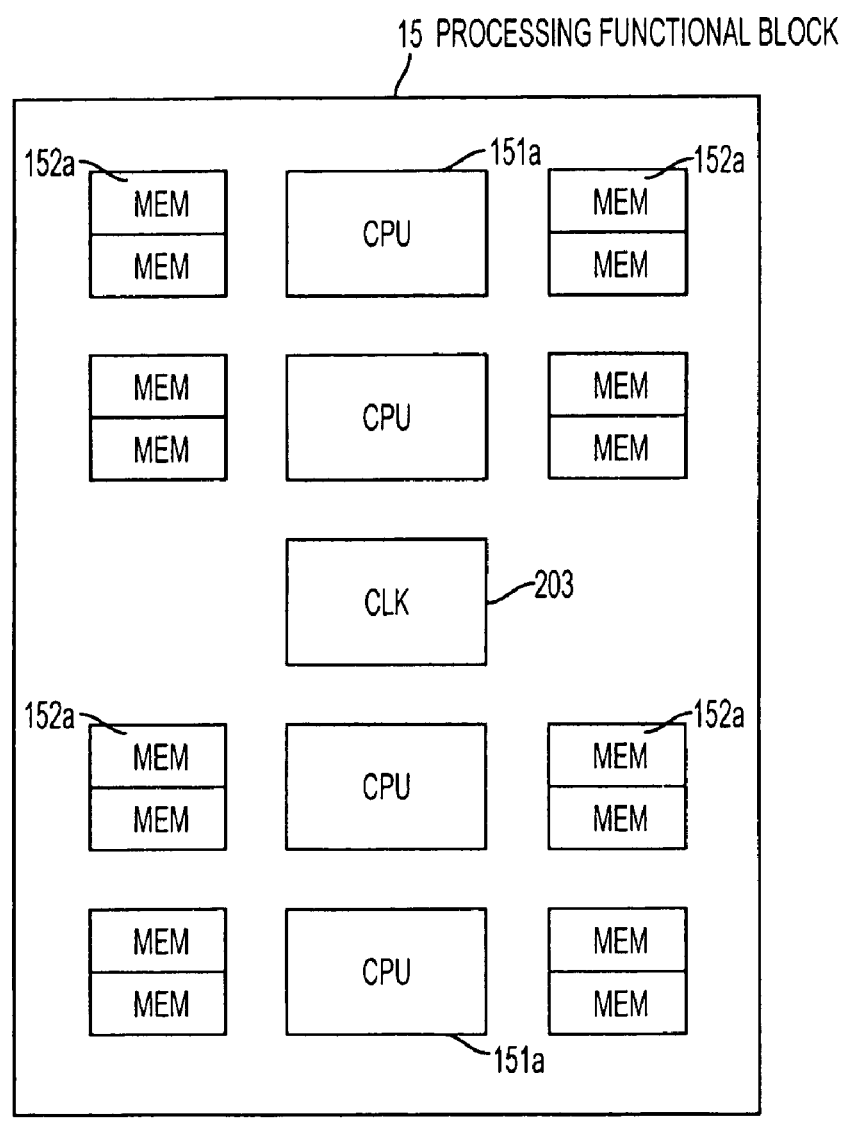
FIG. 17 is a plan view showing a state of modules mounted on a board of a processing functional block.

FIG. 17 is a plan view showing a state of modules mounted on a printed circuit board in a processing functional block 15 shown in FIG. 3.

In this figure, the processing functional block 15 comprises a plurality of CPUs 151a, memories (MEM) 152a, and one clock generator (CLK) 203. Specifically, the CPUs 151a include a maximum of four modules, and the memories 152a include a maximum of sixteen modules. Also, it is assumed that the CPUs 151a comprise two types of modules, and the memories 152a comprise three types of modules including 256 MB modules, 512 MB modules and 1 GB modules, which are classified according to their storage capacity.

Describing it by way of example, the configuration of CPUs 152a of the processing functional block 15 can be varied from 1 module to 4 modules, and the configuration of the CPUs 151a can be input through a similar means as described above with reference to the first and third embodiments. For example, when the processing functional block 15 is changed from one configuration comprising one CPU to another configuration comprising four CPUs by addition of three CPUs, the addition of the configuration information is input through the touch panel 28 according to the similar procedure. The MPU 53 takes out power consumption values corresponding to the types of the added modules from the power consumption information table in the ROM 52 in the similar procedure, and recalculates, based on the power consumption values thus taken out, the power consumption value which is then compared with the power supply capacity.

Even if the user gives a "power-on" instruction when the power consumption value thus calculated exceeds the power supply capacity, the MPU 53 rejects the "power-on" instruction, or does not supply power to the blocks added by the modules.

The same is applied to the case in which the configuration of the memories 152a is changed. That is, based on the types and number of the added or subtracted memories 152a, the MPU 53 recalculates the power consumption value and performs power supply control accordingly.

Moreover, in the above-described embodiments, the respective blocks and the respective modules can be changed in the active state of the device (this is called "live exchange"), so the configuration can be changed during power-up.

In this case, a change of the configuration information is input through the touch panel 28 with power being turned on, so that recalculation of the power consumption value is carried out based on the changed configuration information, and thereafter the power consumption value thus obtained is compared with the power supply capacity. When the power consumption value is less than the power supply capacity, an indication that a configuration change is possible is displayed on the touch panel 28. On the other hand, when the power consumption value is not less than the power supply capacity, an indication that any configuration change is impossible is displayed on the touch panel 28. Thus, the user can actually change the device configuration based on the indication on the touch panel 28. In this manner, it is possible to maintain safe operation of the device even with the live exchange.

Further, the processing of the control device can be set such that power can be forcedly cut off for avoiding a dangerous situation in the event that inappropriate configuration information, for which the above-mentioned configuration change is impossible, is input during power is turned on.

Embodiment 8

An eighth embodiment of the present invention is to describe a recording medium.

Figure 18:
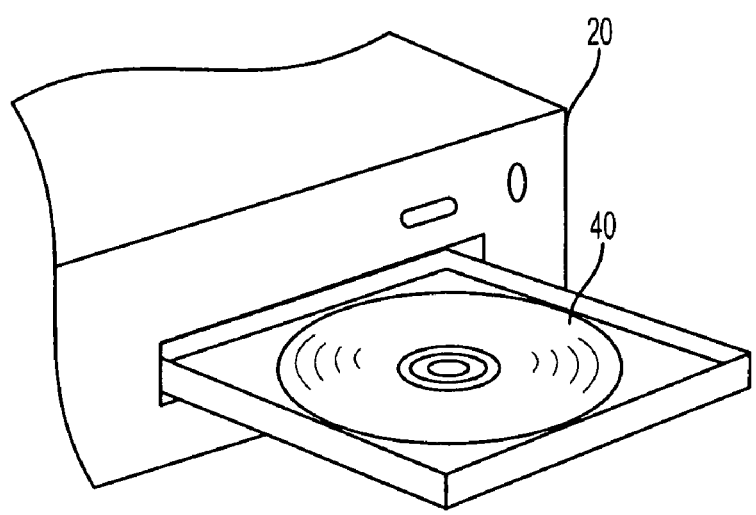
FIG. 18 is a diagrammatic view showing a recording medium in the form of a CD-ROM.

FIG. 18 illustrates an example of such a recording medium in the form of a CD-ROM 40 on which is recorded data having a structure such as the information table shown in FIGS. 6 through 9 in the aforementioned embodiments, or a program which is adapted to be executed by a computer (i.e., the server apparatus 20) to perform any of the operations of the first through seventh embodiments.

The power consumption information table in FIG. 7 and the power supply capacity information table in FIG. 9 contain power consumption values and power supply capacity values for various kinds of products of a lot of manufacturers already written therein, and they are of a ready-to-use structure, so using these data serves to make it possible to greatly alleviate data input operations for inputting power values for power supply control. In addition, such a recording medium may be one having an area into which the user himself or herself can written his or her own data such as the respective types or kinds of products, their power consumption values, their power supply values, etc. With such a structure of the recording medium, in the case of using products of a certain manufacturer for which no data is written in advance into the recording medium, it becomes possible for the user to perform power supply control by use of the recording medium.

In this connection, note that though not shown, the configuration information table of FIG. 6 and the power supply configuration information table of FIG. 8 have such a structure that the user can freshly input configuration information into these tables with the number of data being variable.

Although in the foregoing description, various embodiments of the present invention have been shown and described, the power supply control apparatus according to the invention can of course be applied to information processing apparatuses, control apparatuses and the like other than server apparatuses.

As described above in detail, according to the present invention, there is provided a very useful and improved power supply control apparatus and a server apparatus equipped with the same in which it is possible to easily calculate and predict a necessary and sufficient power consumption value in a device which consumes electric power. As a result, it can positively prevent a shortage or surplus of the power supply capacity, thus saving unnecessary costs for power supply equipment. Still further, it is also prevent the occurrence of critical situations such as missing or loss of stored information due to a shortage of the power supply capacity.

While the invention has been described in terms of several preferred embodiments, those skilled in the art will recognize that the invention can be practiced with modification within the spirit and scope of the appended claims.

The invention claimed is:

1. A power supply control device for a variable maximum power consumption apparatus which is supplied with electric power from a power supply, said device comprising:
   a calculator for calculating a power consumption value of said variable maximum power consumption apparatus based on configuration information on each configuration unit constituting said variable maximum power consumption apparatus and an amount of power consumed by each configuration unit; and
   a controller for performing a predetermined procedure based on the power consumption value calculated by said calculator.

2. The power supply control device according to claim 1, further comprising a detector for detecting an amount of power supplied from said power supply to said apparatus during operation of said apparatus, wherein said controller performs the predetermined processing in accordance with the detection result of said detector.

3. The power supply control device according to claim 1, further comprising:
   a storage element for storing said configuration information; and
   an input device for inputting said configuration information to said storage element so as to be stored therein.

4. The power supply control device according to claim 2, further comprising an input device for inputting said configuration information to said calculator, said calculator being operable to calculate the amount of power consumption of said device based on the configuration information inputted by said input device and the amount of power detected by said detector.

5. The power supply control device according to claim 3, wherein said storage element stores information relating to configuration units comprising the apparatus and an amount of power consumption corresponding to each configuration unit, generating historical data to estimate the power consumption of the configuration units to be connected to said apparatus.

6. The power supply control device according to claim 1, wherein said controller comprises:
   a comparator for making a comparison between the amount of power consumption calculated by said calculator and a power supply capacity of said power supply: and
   a control operation element for performing a predetermined control operation based on the result of comparison performed by said comparator.

7. The power supply control device according to claim 6, further comprising:
- a power supply capacity calculator for calculating the power supply capacity of said power supply based on the configuration information on each power supply configuration unit constituting said power supply and an available power supply capacity which is able to be supplied by each power supply configuration unit;
- wherein said comparator makes a comparison between the power supply capacity calculated by said power supply capacity calculator and said amount of power consumption.

8. A variable maximum power consumption apparatus comprising:
- a main unit proper having at least one processing functional block for processing information;
- a power supply unit having at least one power supply functional block for supplying electric power to said processing functional block; and
- a power supply control device including a controller for calculating an amount of power consumption of said variable maximum power consumption apparatus based on configuration information of said processing functional block and an amount of power consumed by each power supply functional block, said controller calculating an amount of power supplied by said power supply unit based on the configuration information of said power supply functional block and an amount of power supplied to each power supply functional block, said controller performing a predetermined processing in accordance with the amount of power consumed by said main unit thus calculated and the amount of power supplied by said power supply unit thus calculated.

9. The apparatus according to claim 8, further comprising a detector for detecting an amount of power outputted from said power supply unit to said main unit during operation of said apparatus, wherein said controller performs the predetermined processing in accordance with the detection result of said detector.

10. A medium being readable by a computer and having a program recorded thereon which is executed by said computer, said computer being operated, when executing said program,
- to calculate an amount of power consumed by a variable maximum power consumption apparatus, which is supplied with electric power from a power supply, based on configuration information on each configuration unit constituting said apparatus and an amount of power consumed by each configuration unit; and
- to perform a predetermined processing based on the amount of power consumption thus calculated.

11. A data recording medium being readable by a computer, said medium storing configuration units constituting a variable maximum power consumption apparatus, which is supplied with electric power from a power supply, and an amount of power consumed by said configuration units as power consumption information, said medium retrievably storing said configuration units constituting said variable maximum power consumption apparatus and an amount of power consumption corresponding to each configuration unit, in order that a computer calculates a power consumption of said variable maximum power consumption device based on said configuration information and said power consumption information and performs a predetermined processing based on the power consumption value thus calculated.

12. The power supply control apparatus according to claim 1, wherein the predetermined procedure is displaying an optimal power supply capacity.

13. The power supply control apparatus according to claim 12, wherein the optimal power supply capacity is displayed in such a manner that, when the power supply capacity is greater than the computed power consumption value, one of:
- a surplus of the power supply capacity is displayed; and
- one of the reducable power supply functional blocks is displayed.

14. The power supply control apparatus according to claim 12, wherein the optimal power supply capacity is displayed in such a manner that, when an available power supply capacity is less than the power consumption value calculated by said calculator, one of:
- a shortage of a power supply capacity is indicated;
- an optimal number of power supply functional blocks is indicated; and
- addition of another power supply functional block is indicated.

* * * * *

UNITED STATES PATENT AND TRADEMARK OFFICE
CERTIFICATE OF CORRECTION

PATENT NO. : 7,058,480 B1
APPLICATION NO. : 09/706859
DATED : June 6, 2006
INVENTOR(S) : Toshiharu Kawanishi et al.

It is certified that error appears in the above-identified patent and that said Letters Patent is hereby corrected as shown below:

Column 20, Line 63, Change "supply:" to --supply;--.

Signed and Sealed this

Twenty-eighth Day of November, 2006

JON W. DUDAS
*Director of the United States Patent and Trademark Office*